United States Patent [19]
Vice et al.

[11] Patent Number: 5,161,753
[45] Date of Patent: Nov. 10, 1992

[54] AIRPLANE PROTECTIVE AND MAINTENANCE SYSTEM

[75] Inventors: John B. Vice, Seattle, Wash.; James K. Kunkle, Solvang, Calif.

[73] Assignee: Amstrarch, Inc., Portland, Oreg.

[21] Appl. No.: 593,929

[22] Filed: Oct. 3, 1990

[51] Int. Cl.⁵ .................. B64D 15/10; B05C 5/00
[52] U.S. Cl. .................... 244/134 C; 52/143; 52/169.5; 52/DIG. 12; 134/123; 134/200; 244/116
[58] Field of Search ............ 244/134 R, 134 C, 116; 134/45, 123, 172, 99, 200; 52/79.7, 641, 143, 169.5, DIG. 12

[56] References Cited

U.S. PATENT DOCUMENTS

| | | | |
|---|---|---|---|
| 1,470,557 | 10/1923 | Eremeeff . | |
| 1,848,360 | 3/1932 | Krell | 244/116 |
| 2,260,369 | 10/1941 | Ebenhack | 52/143 X |
| 2,652,906 | 9/1953 | Mitchell | 52/79.7 |
| 2,981,266 | 4/1961 | Tamburri | 134/123 |
| 3,258,019 | 6/1966 | Bellas et al. | 134/99 |
| 3,533,395 | 10/1970 | Yaste . | |
| 3,612,075 | 10/1971 | Cook | 244/134 C |
| 3,838,879 | 10/1974 | Lilly . | |
| 4,192,105 | 3/1980 | Morgan | 52/DIG. 12 |
| 4,378,755 | 4/1983 | Magnusson et al. | 134/123 |
| 4,634,084 | 1/1987 | Magnusson . | |

FOREIGN PATENT DOCUMENTS

260107  5/1913  Fed. Rep. of Germany .

Primary Examiner—Joseph F. Peters, Jr.
Attorney, Agent, or Firm—Griffin, Branigan & Butler

[57] ABSTRACT

System for applying compounds protective against ice formation on airplanes and for also cleaning and washing at respective first and second locations of at least one unitary covered structure. The unitary covered structure can be at least seasonally, or more often as requirements dictate, shuttled between a location immediately adjacent the clear zone of a runway for cold weather, or storm, operations and a location remote from said clear zone for washing in warm weather operations. Both positions of the covered structure have dedicated supply and drainage system for the fluids supplied at each position. Several unitary covered structures of various dimensions at several locations adjacent to the clear zone of a runway are also shown.

14 Claims, 6 Drawing Sheets

AIRPLANE PROTECTIVE AND MAINTENANCE SYSTEM

This invention relates to systems for both protecting airplanes from the effects of weather as well as maintaining such airplanes from the deleterious effects of dirt.

More particularly, this invention relates to a system of structures which are available for year round use for multiple functions—both airplane protection and maintenance—to thus increase its utility.

BACKGROUND AND OBJECTS OF THE INVENTION

Airplanes operating in the northern hemisphere are frequently forced to function in a wide variety of climatic conditions, including snow, sleet, and freezing rain. When these climatic conditions cause the adherence and build-up of "ice" on the flight sustaining and controlling (aerodynamic) surfaces of an airplane, disaster becomes a likely prospect. Adherence and build up of "ice" (or dirt) on the fuselage of the airplane, while not as directly critical to flight performance as build-up on the aerodynamic surfaces, is also undesirable because of the weight and drag added to the airplane by such build-up. Accordingly, the prior art has provided systems which attempt to deal with these undesirable phenomena, at least while the airplane is on the ground, by subjecting the airplanes to "protective treatments" which either remove, or prevent—more properly, delay—the formation of, ice on the airplane prior to take-off. These "protective treatments" typically comprise the application, more or less uniformly across the major, including aerodynamic, surfaces of an airplane, of protective compounds comprising at least de-icing, and possibly also subsequent anti-icing, chemical compounds, preferably in the form of liquid sprays.

As illustrated, for example, by U.S. Pat. No. 4,378,755, more recent and advanced airplane protection systems are more or less automated and also recognize both the inherent waste and environmental risks resulting from the uncontained application of liquid chemicals to the airplanes. Accordingly, additional drainage and sump—or collection—systems are provided as an adjunct to the spray application systems to both re-cycle, and prevent ground contamination by, any excess spray.

Moreover, the system of the '755 patent also recognizes the possibility of providing a plurality of structures to allow the application of a plurality of different compounds to the airplane. However, despite the sound principles underlying such prior art systems, they still lack certain essential features which would greatly increase their effectiveness and utility and hence decrease their costs.

For one thing, because none of the prior art protection systems known to the applicants enclose the entire airplane, i.e. protect the airplane with a cover, during the application of the "treatment", an inevitable effect is the dilution, if not also contamination, of the protective compounds—if contained and collected—by the elements, such as rain or snow. More seriously, the lack of cover over the protective compound application stage continues to expose the airplane to the very elements against which "immunization" has just been attempted. In the face of this continued exposure, the prior art has simply been tempted to use the brute force of approach of either "more compound", or "more compounds". That is, because de-icing compounds have a limited "holdover", or protective, effect after application, continued exposure of the airplane to the elements—whether due to lack of cover and/or time lag between compound application and take-off—requires the application of either excessive de-icing, and/or subsequently applied anti-icing, compounds that delay (rather than eliminate) the formation of ice. Neither alternative is without adverse consequences, especially the application of anti-icing compounds.

Anti-icing compounds, known generally as "Type II" fluids, function in a significantly different manner from de-icing compounds, known generally as "Type I" fluids. Type I fluids, which typically comprise a more or less concentrated, aqueous solution of ethylene or propylene glycol, exhibit a viscosity characteristic that essentially allows them to drip-off the stationary airplane after application. Type II fluids (also nicknamed as "Gorilla Snot" in the trade) on the other hand, have an additional gelling agent added to a typical Type I formulation so that continued adherence (as suggested by the nickname) to the airplane surfaces is possible to thus delay the formation of ice while the airplane is on the ground. As the airplane accelerates for take-off, the applied Type II fluid rapidly loses viscosity and is essentially "stripped" off the airplane once an air speed of about 100 knots is reached.

The variable viscosity of Type II fluids described above, otherwise known to those skilled in the art as the variable reaction to the varying shear stress as a result of the velocity gradient across the Type II fluid surface, immensely complicates the nature of the systems required to apply these fluids. Because the viscosity change, once it occurs, is irreversible, Type II fluids have to be "gently squeezed on" so as not to expose them to a level of shear stress which renders them unusable. As if this weren't enough, Type II fluids are also much more hostile, i.e. corrosive, to the equipment used to apply them, so that uniquely dedicated, corrosion resistant, application systems utilizing stainless steel have to be employed. Finally, because the velocity required to "strip" the airplane of the applied Type II fluid is on the order of a minimum of about 100 knots, smaller airplanes which normally do not require such high rotation velocities, may be forced into an operating region closer to the boundaries of their performance envelopes when Type II fluids have been applied to them. In short, Type II fluids have enough significant disadvantages that their us becomes desirable only as a last resort.

Accordingly, it is a prime object of this invention to provide an airplane protective system which uses less chemical compound, and which may even, in certain circumstances, entirely eliminate the need for type II fluids.

A system which serves merely to protect airplanes against the adverse effects of cold weather phenomena would have—even in the northern hemisphere—only a limited, seasonal utility. This seasonally limited utility in turn leads to greatly increased "life cycle" costs because the total cost of a system can only be recovered over a greater length of time.

Accordingly, it is another object of this invention to provide an airplane protection system which has functions and capabilities allowing such system to be used year round for purposes other than merely airplane protection, such as, for example, washing, or routine, maintenance. The washing of airplanes is a highly desirable maintenance function contributing to the increased aerodynamic efficiency of, and consequently lower fuel costs for, the airplane.

SUMMARY OF THE INVENTION

According to the invention, airplanes are subjected to protective and/or maintenance treatment within a desired plurality of structures which are both covered and movable so that the structures can be at least seasonally, or more often as requirements—such as an approaching storm—dictate, shuttled from one position, such as the end of the taxi-way close to the take-off location, to another position, remote from the take-off location. The word "seasonally" therefore, as used in the specification and claims, is designed to also embrace movement more than just twice a year. Each position of the covered structure—whether on the taxi-way or remote therefrom—has its own associated drain and collection system for collecting those fluids, or compounds, which may desirably be applied to the airplane at each position. For example, once out of the region of the taxi-way, a covered structure may be used for washing an airplane—an otherwise necessary function—which need not and should not (except perhaps in the colder months where some washing is incidental to the application of an aqueous chemical spray) be performed along the taxi-way.

The moveability of the covered structure allows the positioning of the covered structure so close to the take-off position of the airplane in the winter time that both the consequence of an extended "holdover" period between ice protective compound application and take-off—as well as the hazards of continued exposure associated with the lack of cover of the systems in the prior art—are minimized or essentially eliminated.

Each covered structure of the airplane protection and maintenance system is desirably equipped with all the necessary components for applying water and/or protective compounds at each position of the covered structure.

Because the structures according to the system of the invention are preferably and seasonally moved from a position along the taxi-way to a position or location, remote from the taxi-way, that is, transversely to the runway, it is important that the structures have the required rigidity to withstand such repeated movements. Moreover, the structures also need to satisfy length, span, and height (LSH) criteria to accommodate airplanes on the maximum order of the size of a Boeing 747, where the relevant respective dimensions are about 400 feet, 320 feet and 85 feet. While any covered structure that meets the required rigidity and LSH criteria may be utilized in a system according to the invention, preferably the structure takes the form of the arch-like, ground assembled, structure disclosed in U.S. Pat. No. 4,890,429, the contents of which are expressly incorporated herein by this reference. Structures according to the '429 patent feature large span capabilities in a unitary form and are thus to be as disclosed in U.S. Pat. Nos. 1,470,557 and 2,652,906, distinguished from merely "movable" hangars, e.g. such which can achieve large spans, only by "assembling" the hangar from multiple, movable sections. While a covered structure utilized in the system of the invention may also be formed from several, independently movable, sections, that is not a requirement, even for large spans in excess of 100 feet.

The foregoing and other objects, features, and advantages of the invention will be apparent from the following more particular description of several preferred embodiments of the invention, as illustrated in the accompanying drawings.

DETAILED DESCRIPTION

Figure 1:
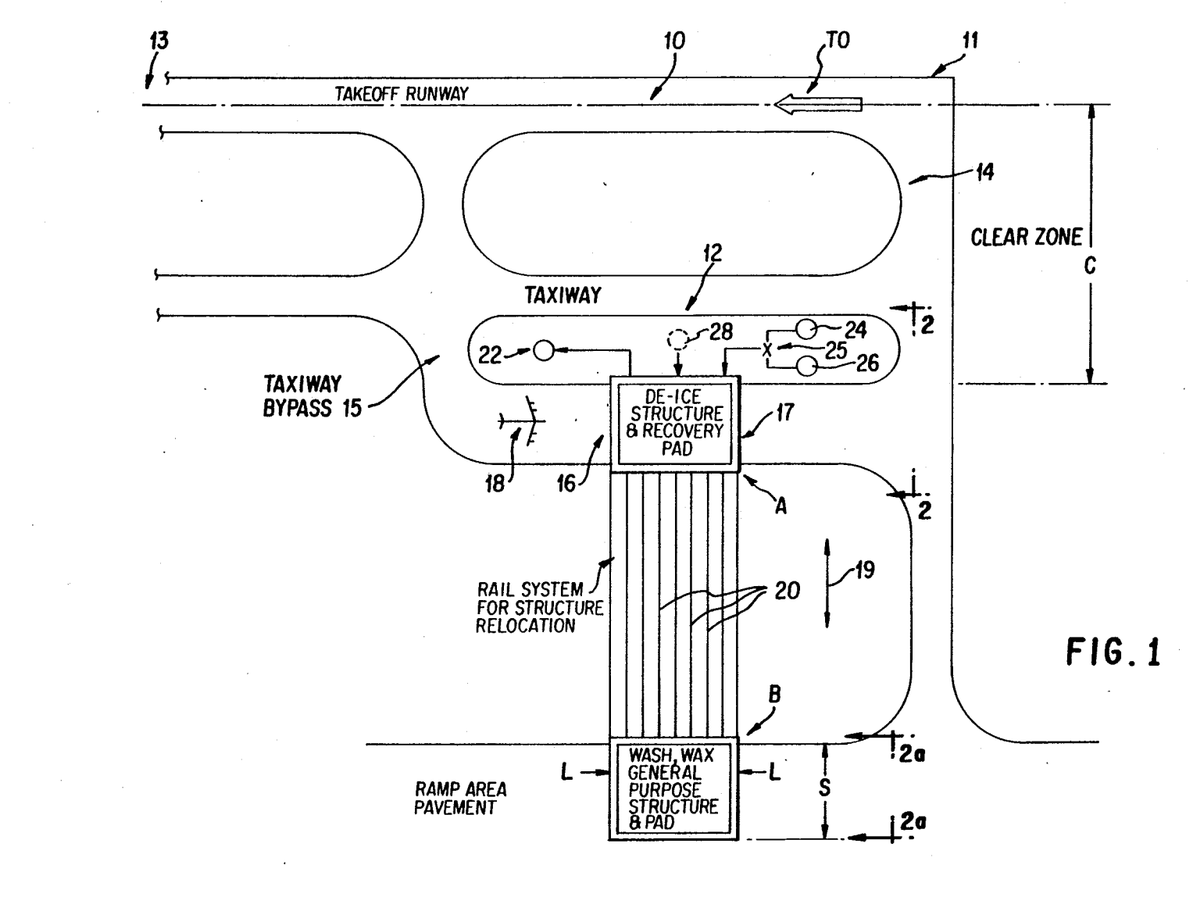
FIG. 1 is a plan schematic of the several structural features and components of an airplane protective and maintenance system according to the invention.

Referring now to FIG. 1, there is shown a typical airport configuration comprising a runway 10 with at least one adjacent taxi-way 12. Generally, but not necessarily, runway 10 and taxi-way 12 are parallel. Runway 10 may be used alternately as both a take-off, and landing, runway. A turn area 14 linking the end of taxi-way 12 with the take-off end 11 of runway 10. It is understood that runway 10 will also have a corresponding end 13, opposite take-off end 11, with a corresponding turn area (not shown) corresponding to turn area 14 when take-off direction along runway is reversed from that shown in FIG. 1 by the arrow TO. Turn area 14 is commonly used to allow the taxiing airplane to make the turn from the taxi-way 12 to assume a hold position prior to entry on the runway 10 for a subsequent take-off roll. A taxi-way bypass 15 is located adjacent to taxi-way 12 in a configuration in which the system of the invention is retro-fitted to an existing airport with a previously existing taxi-way 12. This taxi-way bypass 15 can be added, or retro-fitted, to an existing airport layout without disturbing taxi-way 12. At new airport installations, taxi-way bypass 15 may be omitted.

According to the invention, at least one unitary covered structure 16 (hereinafter referred to merely as covered structure 16 for the sake of brevity), straddles, or spans, the taxi-way bypass 15 so as to allow an airplane 18 to pass through covered structure 16 to be de-iced, and possibly anti-iced, prior to take-off on runway 10. Depending upon individual airport topology, covered structure 16 may be located in turn area 14 (as shown in an alternate preferred embodiment in FIG. 5), rather than at the end of taxi-way bypass 15 as illustrated in FIG. 1. In any event, the location A of covered structure 16 is so chosen as to create a minimum distance between the exit 17 thereof and the take-off end 11 of runway 10 to minimize exposure distance—hence, time—of airplane 18 after it has left exit 17 subsequent to treatment within structure 16, and prior to take-off on runway 10. Location A must be as close as it can be to, but not intruding into, the so-called clear zone "C"

shown in FIG. 1. Clear zone "C" is established by regulations and limits the distance and height (from the centerline of the runway) within which no structures may be placed to accommodate landing airplanes. In the United States, the clear zone "C" is 500 feet, from which point a structure can have a height increasing at a 1:7 slope from that point.

Covered structure 16 has a length L and a span S so dimensioned as to enclose, or cover, within its dimensions airplanes with the greatest length and wing span currently, or prospectively, in use at a particular airport. As will be described below, covered structure 16 also has a height H so as to allow the tail section (normally the tallest part of an airplane) of airplane 18 sufficient clearance to pass therethrough.

Position A of covered structure 16 is the preferred position at all those times when airplanes, such as airplane 18, need to be treated against the adverse effects of cold moisture likely to cause ice buildup on the airplane. This may typically comprise the period between November and March, although each airport will have its own "cold" season. Furthermore, as previously stated, position A may also be occupied at other times, on a shorter term basis, when an approaching storm makes that desirable.

After the "cold" season has ended, covered structure 16 is removed from position A adjacent to the take-off end 11 of runway 10 to a position, or location, B remote from runway 10. Position B of covered structure 16 is so chosen at each airport as to allow the performance thereat of ordinary washing and cleaning functions for an airplane. No later than when the next cold season arrives, covered structure 16 is again moved to position A and is seasonally shuttled between positions A and B as indicated by arrow 19.

To allow shuttling of covered structure 16 between position A and position B, a set of tracks 20 is provided between position A and B along which movement of covered structure 16 is allowed and performed. The exact number of tracks comprising a set of tracks 20 is determined by the length L of covered structure 16. As will be described in greater detail below, if covered structure 16 takes the form of those structures described in the '429 Patent, a track is preferably provided for each truss-arch, a plurality of which are spaced along L to constitute the length L of covered structure 16.

If the configuration shown in FIG. 1 allows a position A deemed sufficiently close to the take-off end 11 of runway 10 to allow the application of only Type I, i.e. de-icing fluids, there is provided only one drain and collection system 22 which collects the fluids applied to airplane 18 when it is within the confines of covered structure 16. Under these circumstances, only one supply system 24 is necessary for the supply of Type I fluids, preferably in combination with water from a supply 26 of water, preferably heated, and combined for common delivery through a mixing valve 25. In this, the most desirable, set of circumstances, Type I fluids together with heated water are sufficient to provide airplane 18 with all the necessary protection against ice prior to take-off. No application of Type II fluids, with their attendant complications, is necessary.

Under the circumstances described in the previous paragraph, any excess application of water from supply 26 together with Type I fluids from supply 24 to airplane 18 is collected in a joint collection system 22 which is associated with position A. The mixture of water and ethylene (or propylene) glycol thus collected in system 22 is available for re-use once the required concentration of Type I fluids has been restored by a proper setting of mixing valve 25 which proportions water and glycol.

It is important to note that by virtue of a cover over covered structure 16 no contamination, or dilution, of the fluids collected in system 22 by the elements has occurred. Moreover, by virtue of the cover over covered structure 16, the airplane 18 has been protected within the confines of structure 16 against further action of the elements tending to destroy the ice "immunity" just conferred Furthermore, the moveability of covered structure 16 has allowed the positioning of covered structure 16 at location A so close prior to take-off that the "ice" immunity conferred is not destroyed by the short distance between exit 17 of covered structure 16 and the take-off end 11 of runway 10. Finally, by virtue of the cover over covered structure 16, the application of whatever protective spray is applied to airplane 18 within the covered structure 16 is far less subject to the influence of winds which would tend to cause spray drift and may result in non-uniform spray application.

If the position A illustrated in FIG. 1 is not deemed sufficiently close to the take-off end 11 of runway 10 as to allow only the application of Type I fluids together with water, at least a second supply system 28 for Type II fluids may be provided for a subsequent application of Type II fluids. Because of the provisional nature of system 28, it has been indicated in a circle with dotted outlines in FIG. 1. It is understood that a similar drain and collection system, and a similar supply system (except for de-icing fluids), would also be provided at position B, even though not shown in the drawings.

Figure 2:
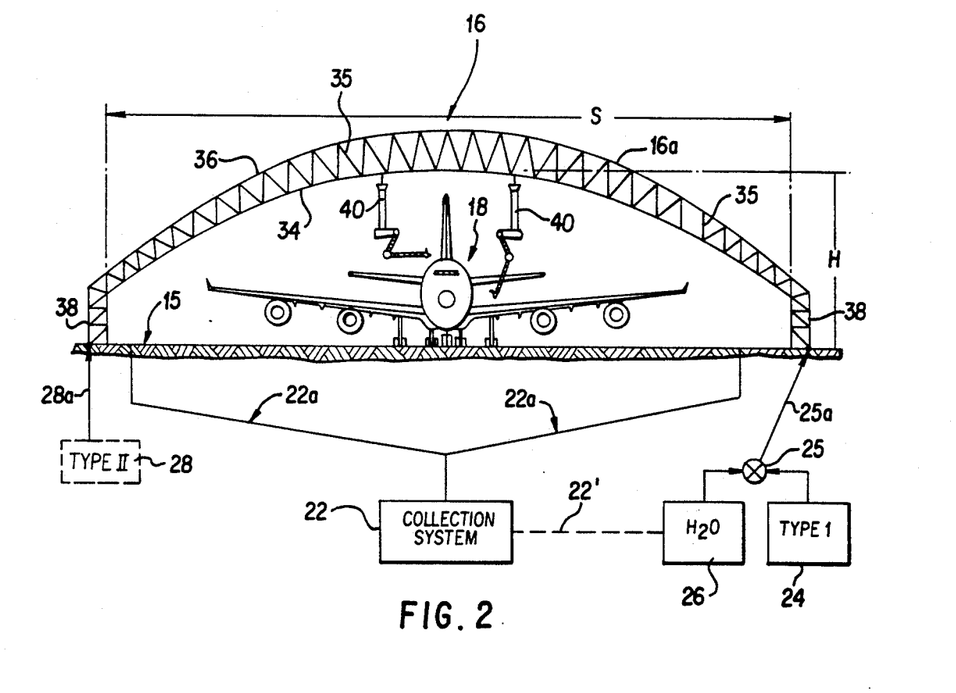
FIG. 2 is an elevation schematic of the several structural features and components of an airplane protective and maintenance system according to the invention, shown along the line "2—2" of FIG. 1.

Referring now to FIG. 2, there is shown a cross-section view along line 2—2 of FIG. 1 and it shows a cross-sectional view of covered structure 16, having a span S and a height H situated on taxi-way bypass 15. Disposed within the confines of covered structure 16 is an airplane 18. FIG. 2 also shows, in schematic view, the collection system 22 which collects the aqueous Type I mixture via collection lines 22a. The aqueous Type I solution is provided by Type I supply 24, water supply 26 passing through a mixing valve 25 where the proper proportion of the Type I fluid with water is established. The necessary pumps associated both with the Type I supply 24 and the water supply 26 are not shown because the details thereof are deemed obvious to those skilled in the art. A supply line 25a provides the aqueous Type I mixture via lines (not shown) for the purpose, and in a manner, hereinafter to be described.

An optional Type II supply system 28 is also indicated within the dotted outlines of block 28 to supply Type II fluids, via line 28a, if that becomes necessary.

Covered structure 16 comprises a plurality of trusses, like 16a shown in FIG. 2, to constitute a covered structure 16 having a length L (see FIG. 1). Each truss 16a is comprised of a lower chord 34 and an upper chord 36, the latter of which also carries suitable cladding as the roof cladding. Lower chord 34 and upper chord 36 are spaced apart by diagonal web members 35. End columns 38 support truss 16a on the ground of taxi-way bypass 15.

Figure 2A:
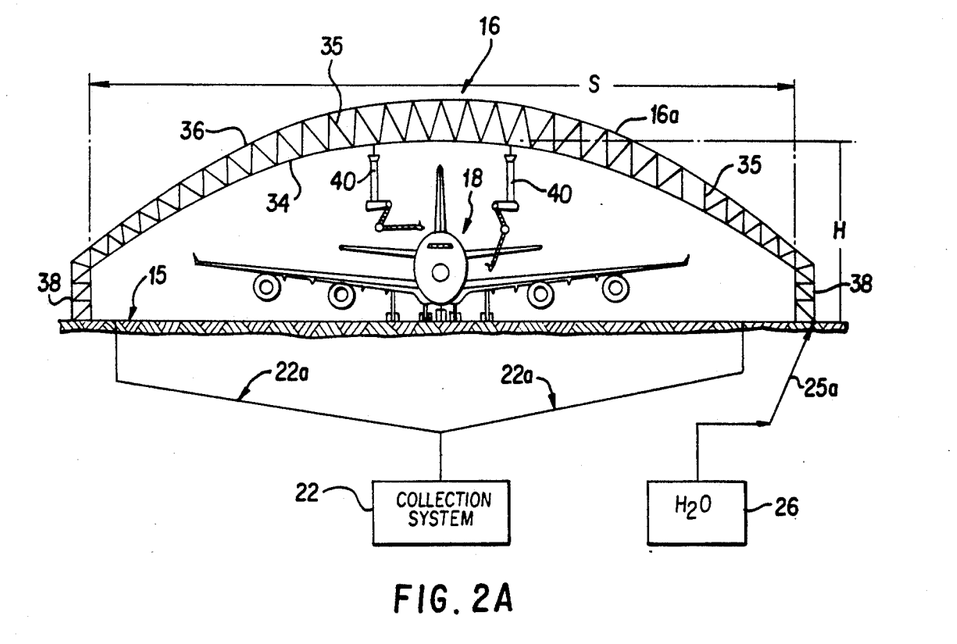
FIG. 2A is an elevation schematic of the several structural features and components of an airplane protective and maintenance system according to the invention, shown along the line "2a—2a" of FIG. 1.

A plurality of robot arms 40 are suspended from the ceiling of covered structure 16 to dispense, through suitable nozzles (not shown), a desired aqueous mixture of Type I de-icing fluid, or optionally, subsequent Type II anti-icing fluids, to the surfaces of airplane 18 at position A. At position B, robot arms 40 need only supply cleaning fluids, such as, for example, water mixed with desirable cleaning agents, as shown in FIG. 2A, where all components (except those deleted), shown in numbering identical to FIG. 2, have the identical function, at position B, as described with reference to position A, shown in FIG. 2. Any excess fluid sprayed on the airplane is collected by the collection system 22 fed by the drain lines 22a. The proper drain from taxi-way bypass 15 may be achieved in any number of ways (not shown) obvious to those skilled in the art, such as, for example, by suitably crowning the surface of taxi-way bypass 15 about the center line CL to drain the fluid to the edges thereof or by a group of individual collection points, spaced along the width and length of taxi-way bypass 15, (such as shown, for example, in the '755 Patent), feeding a common drain line.

Any excess aqueous Type I solution applied to airplane 18 which does not adhere to the surfaces of airplane 18 is collected by the collection system 22 and, because the covered structure 16, it is essentially uncontaminated by the elements. Therefore, these excess fluids may be recycled and pumped, for example, through a suitable pump (not shown) into the water supply system 26 via line 22' for further dispensing as described above.

In their simplest form, robot arms 40 may take the articulated forms shown in FIGS. 5, 6 and 7 of U.S. Pat. No. 3,612,075 which disclose various booms to appropriately direct the spray to an airplane. It should be noted that provision can be made, if desired, to have the robot arms 40 movable both along the span S and the length L of covered structure 16 through conventional means (not shown).

Figure 3A:
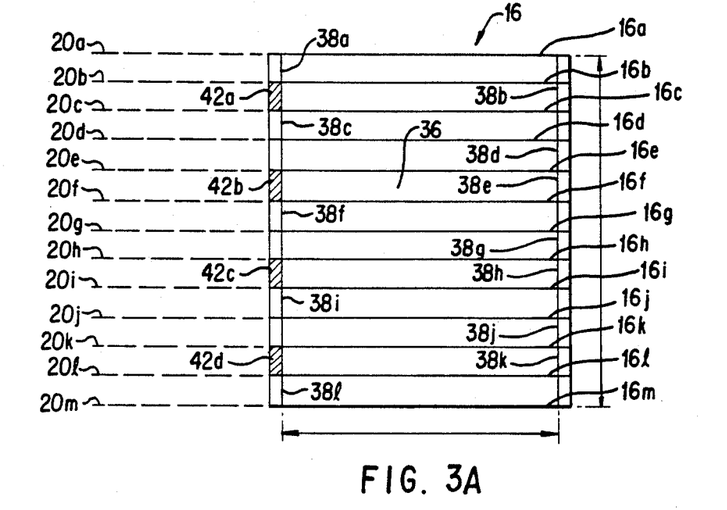
FIGS. 3A and 3B show some structural details of the components preferably utilized to allow movement of the covered structures transversely to the runway direction.
Figure 3B:
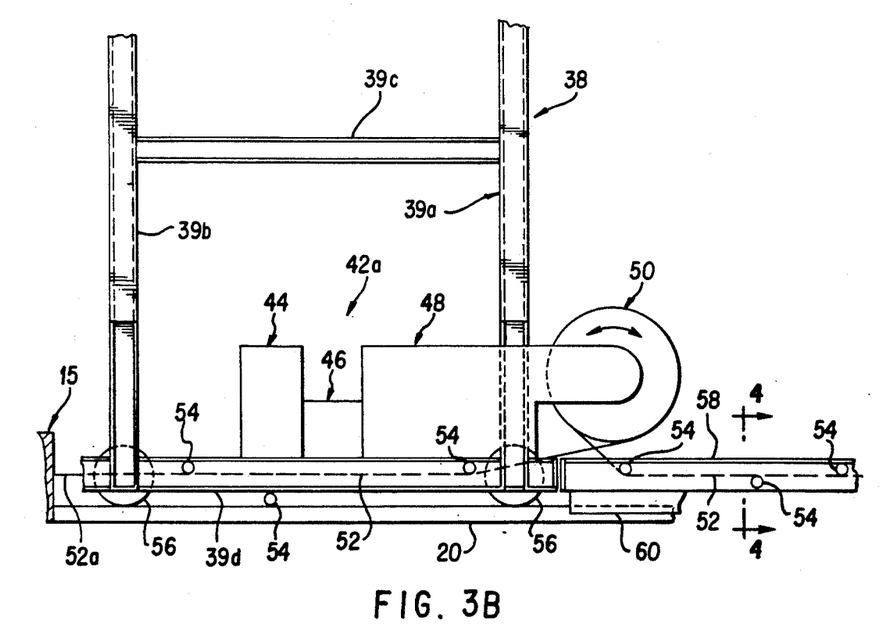
Figure 4:
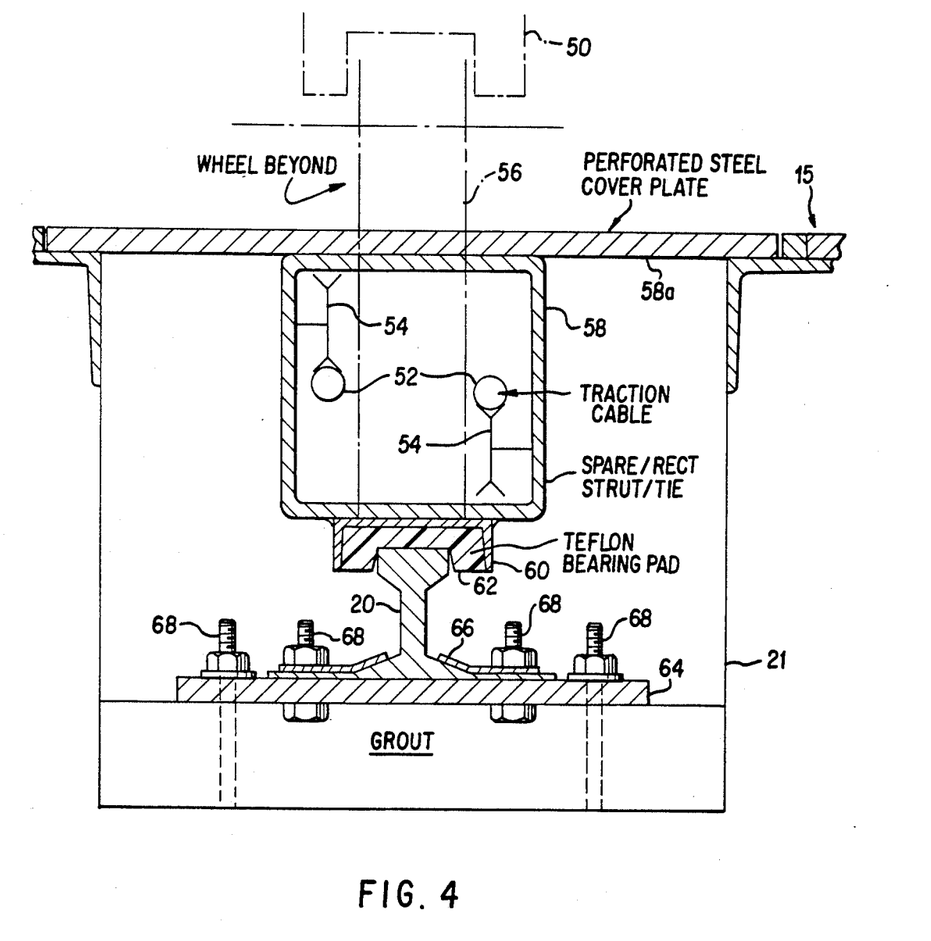
FIG. 4 shows further details, along line "4—4" of FIG. 3B.

Referring now to FIGS. 3A, 3B, and 4, there is shown a plan view of a covered structure 16 comprising a series of trusses 16a–16m with a suitable cladding 36. Covered structure 16 has a length L and an internal span of S. Each truss 16a–16m has associated therewith a set of tracks 20a–20m set in a plurality of trenches 21 (see FIG. 4) built below the grade of the airport surface and extending from the extremities of position A to position B.

Side columns 38a–38l are also shown with each end column 38 comprised of vertical side columns 39a and 39b reinforced by any number of desired plurality of horizontal strengthening struts 39c. Diagonal struts (not shown) may also be added, if desired. A bottom strut 39d connects the two vertical side column members 39a and 39b and supports a desired plurality of drive means 42a through 42d.

Each drive means, for example 42a, comprises a source of power 44, e.g. a diesel engine, which drives a hydraulic motor 48 through a mechanical connection, or shaft, 46. Hydraulic motor 48 in turn reversibly drives a twin drum, variable speed, hydraulic winch as described below. Dual traction cables 52 pass through both the horizontal strut 39d and across the entire span S of covered structure 16. Dual traction cables 52 each have two ends, and each end, e.g. 52a, is anchored to the ground, although only one end, 52a, is so shown. Desirably, dual traction cables 52 may be guided by idler wheels 54 disposed within the horizontal strut 39d.

Each side column 39a and 39b has at the base thereof, a set of wheels 56 designed to run on a rail 20 that is below the grade elevation in each trench 21. Fastened to the horizontal strut 39d is a hollow, rectangular strut 58 which is bolted to horizontal strut 39d by a set of bolts 59. The traction cable 52 also passes through strut 58, again desirably supported by idler wheels 54. Through openings in the top surface of both horizontal strut 39d and strut 58 (not shown), dual traction cables 52 pass onto drum 50 so that, as drum 50 is reversibly driven by hydraulic motor 48, covered structure 16 may move from left to right, or right to left, along the tracks 20.

With reference particularly to FIG. 4, strut 58 has welded thereto a steel cover plate 58a at the top thereof, and at the base rests on rail 20 by means of a teflon bearing pad 62 contained within a flange 60, the latter also welded to strut 58.

Rail 20 is secured within trench 21 by means of a baseplate 64 and flange 68 which, by means of bolts 68, respectively fasten the baseplate 64 to the trench and rail 20 to the baseplate 64.

Both strut 58 and steel-cover plate 58a extend across the entire span S within covered structure 16 and cover plate 58a contains perforations (not shown) which allow the drainage of excess liquid chemical compounds applied to airplane 18 within covered structure 16 into the trench 21. The base of trench 21 may be suitably sloped to drain in only one direction, or in two directions, so as to allow the drainage of chemical compounds not adhering to the surface of airplane 18 to a drainage and collection system 22 by suitable drain lines (not shown).

In operation, the drive means 42a, 42d, operated synchronously, can shuttle covered structure 16 from position A (see FIG. 1) the normal "cold weather" position, to position B, remote from runway 10, in the "summer" season and then back again. Any part of trench 21 exposed after covered structure 16 has been shuttled is covered with suitable steel plates (not shown) which can subsequently be removed prior to the next shuttling.

Figure 5:
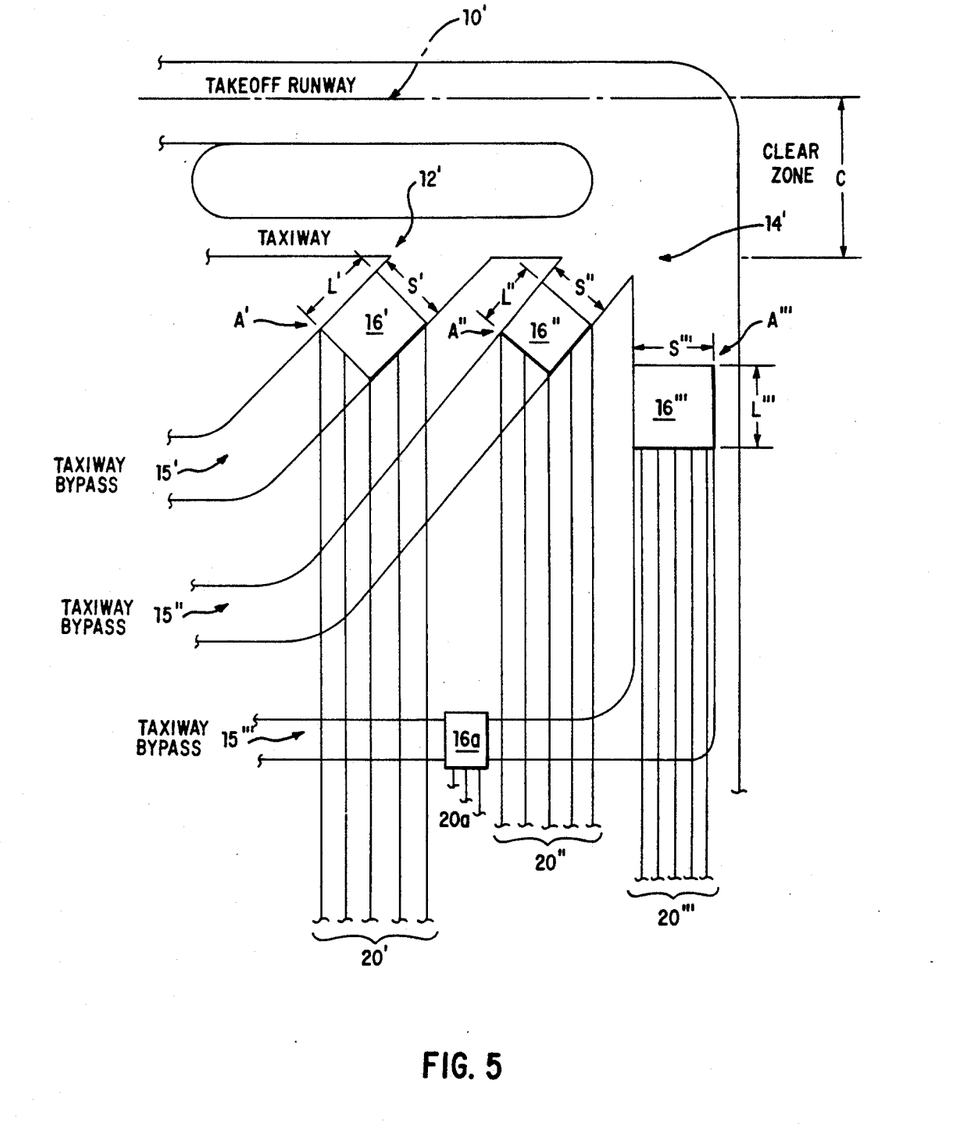
FIG. 5 is a partial plan schematic illustrating alternative preferred embodiments of the invention.

Referring now to FIG. 5, there is illustrated an alternative layout of the movable and covered structures 16', 16" and 16''', located at various positions, A', A" and A''', on respective taxi-way bypasses 15', 15" and 15'''. Each respective covered structure 16', 16" and 16''' is located on its respective set of tracks 20', 20" and 20''', so that they can each be moved to a position B', B" and B''' (not shown) after the "cold season" has ended. Each covered structure 16', 16" and 16''' would have its own associated drainage, collection, and supply system, as was previously illustrated in connection with the description of FIG. 1, at each of its contemplated two positions.

The underlying thought behind the layout shown in FIG. 5 is to provide covered structures 16', 16" and 16''', of possibly variable lengths L', L" and L''', and variable spans S', S"'and S''' to accommodate various sized aircraft, or to accommodate separate operators at a particular airport, each of which desires its own particular covered structure 16', 16" and 16'''.

Moreover, it is noteworthy that while each building has its length L at various transverse orientations to the runway, each can move on its own set of rails in a direction transverse to the runway. Moreover, while the set of tracks 20', 20" and 20''' have all been shown in FIG. 5 as at right angles to the takeoff runway 10', the invention is not so limited. If the topology at any given airport requires it, buildings can be shuttled at any angle with respect to the takeoff runway between a location remote from the runway to a position close to the end of the takeoff runway. Further, for example, each end of runway 10' may have its own covered structure 16 to accommodate takeoffs in both directions.

To allow for movement of the respective plurality of covered structures 16', 16" and 16"', the previously described structures in connection with FIGS. 3A, 3B and 4, need only be modified to allow the wheels 56 (see FIG. 3B), to assume a variable angle with respect to the rails, such as by way of castering, for example.

For those applications where, for example, it is desired to treat an airplane sequentially with distinct ice protective compounds in separate covered structures, a second covered structure, e.g. 16a, may desirably be located on any one, or more, of the taxi-way by passes, such as, for example, 15". Such a covered structure 16a would have its own associated set of tracks 20a for shuttling between its contemplated two positions and its own associated supply and sump system at each position.

While the invention has been particularly shown and described with reference to preferred embodiments thereof, it will be understood skilled in the art that the foregoing and other changes in form and details made be made therein without departing from the spirit and scope of the invention.

We claim:

1. A system for the protection of an airplane, said airplane having both a length and a wing span, against the adverse effects of cold moisture when said airplane is on the ground on a taxi-way, comprising:
   a.) a unitary covered structure located along, and spanning, said taxi-way, said unitary covered structure having a length sufficient to enclose the length of said airplane to be protected and a span sufficient to enclose the wing span of said airplane to be protected; and,
   b.) means associated with said unitary covered structure for applying to said airplane compounds protective against the adverse effects of cold moisture on said airplane; and
   c.) means associated with the location of said covered structure along said taxi-way for collecting compounds applied to said airplane in excess of that amount of compounds which remains in contact with said airplane.

2. A system according to claim 1 wherein there are a plurality of unitary covered structures located along the length of, and spanning, said taxi-way for applying a plurality of distinct compounds protective against the adverse effects of cold moisture on said airplane, to said airplane.

3. A system according to claim 1 wherein said protective compound includes water.

4. A system according to claim 1 wherein said unitary covered structure includes means associated with said unitary covered structure for moving said unitary covered structure from a location along said taxi-way away from said taxi-way to a location remote from said taxi-way.

5. A system according to claim 1 wherein said unitary covered structure includes means associated with said unitary covered structure for moving said unitary covered structure transversely to the length of said unitary covered structure.

6. A system according to claim 2 wherein each of said plurality of unitary covered structures has associated therewith a corresponding plurality of means for collecting said plurality of distinct compounds protective against the adverse effects of cold moisture on said airplane.

7. A system according to claim 4 wherein each said location has associated therewith a collection system for collecting compounds applied to said airplane to excess of that amount of compounds which remains in contact with said airplane.

8. A system for both the protection of an airplane against the adverse effects of cold moisture when said airplane is on the ground prior to takeoff on a runway, said runway having a clear zone, and maintaining said airplane against the adverse effects of dirt on its surfaces, said airplane having a length and wingspan, comprising:
   a.) at least one unitary covered structure located on the ground prior to the takeoff position of the airplane and adapted to cover said airplane both along the length and wingspan thereof; and,
   b.) means associated with said unitary covered structure for applying to said airplane both protective and maintenance compounds; and,
   c.) means associated with the location of said covered structure on said ground for collecting both protective and maintenance compounds in separate collection systems for collecting compounds applied to said airplane in excess of that amount of compounds which remains in contact with said airplane; and,
   d.) means for moving said unitary covered structure from a position on said ground that is prior to the takeoff position to a maintenance position that is remote from said takeoff position.

9. A system according to claim 8 wherein said means for moving include tracks supporting said unitary covered structure, said tracks being oriented transversely to said runway.

10. A system according to claim 8 wherein the location on the ground of said unitary covered structure for applying protective compounds is immediately adjacent to the clear zone of said runway.

11. A system according to claim 8 further including at least one additional unitary covered structure located on the ground prior to the take-off position of the airplane.

12. A system according to claim 8 wherein said covered structure has a length and said means for moving include tracks supporting said covered structure, said tracks being oriented transversely to the length of said unitary covered structure.

13. A system according to claim 8 wherein said covered structure has a length and said means for moving include tracks supporting said covered structure, said tracks being oriented parallel to the length of said unitary covered structure.

14. A system for protecting airplanes from the adverse effects of cold moisture prior to takeoff on a runway having a clear zone and a centerline and for maintaining said airplanes from the adverse effects of dirt, comprising:
   a.) at least one unitary structure having a cover sufficiently long and wide to enclose an entire airplane;
   b.) means for seasonally shuttling said unitary structure transversely to said centerline between a first position and a second position, said first position being immediately adjacent to said clear zone and said second position being remote from said clear zone of said runway, and
   c.) means for applying to said airplane compounds protective against the adverse effects of cold moisture on said airplane prior to takeoff at said first position and for applying to said airplane maintenance compounds at said second position.

* * * * *